United States Patent
Gates

(10) Patent No.: US 7,478,074 B2
(45) Date of Patent: Jan. 13, 2009

(54) SUPPORT VECTOR MACHINE

(75) Inventor: Kevin E. Gates, Taringa (AU)

(73) Assignee: The University of Queensland, Queensland (AU)

( * ) Notice: Subject to any disclaimer, the term of this patent is extended or adjusted under 35 U.S.C. 154(b) by 0 days.

(21) Appl. No.: 10/577,189

(22) PCT Filed: Oct. 29, 2004

(86) PCT No.: PCT/AU2004/001507

§ 371 (c)(1),
(2), (4) Date: Feb. 21, 2007

(87) PCT Pub. No.: WO2005/043450

PCT Pub. Date: May 12, 2005

(65) Prior Publication Data

US 2007/0203861 A1 Aug. 30, 2007

(30) Foreign Application Priority Data

Oct. 31, 2003 (AU) .............................. 2003905991

(51) Int. Cl.
G06F 15/18 (2006.01)
G06K 9/62 (2006.01)
(52) U.S. Cl. ........................................ 706/16; 382/224
(58) Field of Classification Search .................. 706/16; 382/224
See application file for complete search history.

(56) References Cited

U.S. PATENT DOCUMENTS 6,134,344 A 10/2000 Burges

2003/0093393 A1 5/2003 Mangasarian et al.

OTHER PUBLICATIONS

Fung et al., "Minimal Kernel Classifiers", 2002.*
Cluster Analysis (CA), "Cluster Analysis", 2001.*
Downs, T. et al, Exact Simplification of Support Vector Solutions, Journal of Machine Learning Research, vol. 2, Dec. 2001, pp. 293-297.
Lee, Y.-J. et al, RSVM: Reduced Support Vector Machines, First SIAM International Conference on Data Mining, 2001.
Fung, G.M. et al., Minimal Kernel Classifiers, Journal of Machine Learning Research, vol. 3, Nov. 2, 2002, pp. 303-321.

* cited by examiner

Primary Examiner—Joseph P. Hirl
Assistant Examiner—Nathan H Brown, Jr.
(74) Attorney, Agent, or Firm—McDermott Will & Emery LLP

(57) ABSTRACT

A method for operating a computer as a support vector machine (SVM) in order to define a decision surface separating two opposing classes of a training set of vectors. The method involves associating a distance parameter with each vector of the SVM's training set. The distance parameter indicates a distance from its associated vector, being in a first class, to the opposite class. A number of approaches to calculating distance parameters are provided. For example, a distance parameter may be calculated as the average of the distances from its associated vector to each of the vectors in the opposite class. The method further involves determining a linearly independent set of support vectors from the training set such that the sum of the distances associated with the linearly independent support vectors is minimized.

18 Claims, 6 Drawing Sheets

SUPPORT VECTOR MACHINE

FIELD OF THE INVENTION

The present invention relates to a method for selecting a reduced set of support vectors for use during a training phase of a support vector machine.

BACKGROUND TO THE INVENTION

A Support Vector Machine (SVM) is a universal learning machine that, during a training phase, determines a decision surface or "hyperplane". The decision hyperplane is determined by a set of support vectors selected from a training population of vectors and by a set of corresponding multipliers. The decision hyperplane is also characterised by a kernel function.

Subsequent to the training phase a SVM operates in a testing phase during which it is used to classify test vectors on the basis of the decision hyperplane previously determined during the training phase. A problem arises however as the complexity of the computations that must be undertaken to make a decision scales with the number of support vectors used to determine the hyperplane.

Support Vector Machines find application in many and varied fields. For example, in an article by S. Lyu and H. Farid entitled "Detecting Hidden Messages using Higher-Order Statistics and Support Vector Machines" (*5th International Workshop on Information Hiding*, Noordwijkerhout, The Netherlands, 2002) there is a description of the use of an SVM to discriminate between untouched and adulterated digital images.

Alternatively, in a paper by H. Kim and H. Park entitled "Prediction of protein relative solvent accessibility with support vector machines and long-range interaction 3d local descriptor" (*Proteins: structure, function and genetics*, to be published) SVMs are applied to the problem of predicting high resolution 3D structure in order to study the docking of macro-molecules.

The mathematical basis of a SVM will now be explained. An SVM is a learning machine that selects m random vectors $x \in R^d$, drawn independently from the probability distribution function p(x). The system then returns an output value for every input vector $x_i$, such that $f(x_i) = y_i$.

The $(x_i, y_i)$ i=0, ... m are referred to as the training examples. The resulting function $f(x)$ determines the hyperplane which is then used to estimate unknown mappings.

FIG. 1, illustrates the above method. Each of steps 24, 26 and 28 of FIG. 1 are well known in the prior art.

With some manipulations of the governing equations the support vector machine can be phrased as the following Quadratic Programming problem:

$$\min W(a) = \tfrac{1}{2} a^T \Omega a - a^T e \quad (1)$$

where $$\Omega_{i,j} = y_i y_j K(x_i, x_j) \quad (2)$$

$$e = [1,1,1,1,\ldots 1]^T \quad (3)$$

Subject to $0 = a^T y$ (4)

$0 \leq a_i \leq C$ (5)

where

C is some regularization constant. (6)

The $K(x_i, x_j)$ is the kernel function and can be viewed as a generalized inner product of two vectors. The result of training the SVM is the determination of the multipliers $a_i$.

Suppose we train a SVM classifier with pattern vectors $x_i$, and that r of these vectors are determined to be support vectors, denote them by $x_i$, i=1, 2 ..., r. The decision hyperplane for pattern classification then takes the form $$f(x) = \sum_{i=1}^{r} \alpha_i y_i K(x, x_i) + b \quad (7)$$

where $a_i$ is the Lagrange multiplier associated with pattern $x_i$ and K(. , .) is a kernel function that implicitly maps the pattern vectors into a suitable feature space. The b can be determined independently of the $a_i$. FIG. 2 illustrates in two dimensions the separation of two classes by a hyperplane 30. Note that all of the x's and o's contained within a rectangle in FIG. 2 are considered to be support vectors and would have associated non-zero $a_i$.

Now suppose that support vector $x_k$ is linearly dependent on the other support vectors in feature space, i.e.

$$K(x, x_k) = \sum_{\substack{i=1 \\ i \neq k}}^{r} c_i K(x, x_i) \quad (8)$$

where $c_i$ are some scalars.

Then the decision surface defined by equation (7) can be written as $$f(x) = \sum_{\substack{i=1 \\ i \neq k}}^{r} \alpha_i y_i K(x, x_i) + \alpha_k y_k \sum_{\substack{i=1 \\ i \neq k}}^{r} c_i K(x, x_i) + b \quad (9)$$

Now define $a_k y_k c_i = a_i y_i \gamma_i$ so that (9) can be written $$f(x) = \sum_{\substack{i=1 \\ i \neq k}}^{r} \alpha_i (1 + \gamma_i) y_i K(x, x_i) + b \quad (10)$$

$$= \sum_{i=1}^{r} \alpha'_i y_i K(x, x_i) + b \text{ where} \quad (11)$$

$$\alpha'_i = \alpha_i (1 + \gamma_i) \quad (12)$$

Comparing (11) and (7) we see that the linearly dependent support vector $x_k$ is not required in the representation of the decision surface. Note that the Lagrange multipliers must be modified in order to obtain the simplified representation. This process, (described in T. Downs, K. E. Gates, and A. Masters. "Exact simplification of support vector solutions". *Journal of Machine Learning Research*, 2:293-297, 200) is a successful way of reducing the support vectors after they have been calculated.

FIG. 3 depicts the same hyperplane as in FIG. 2, but this time the number of support vectors has been reduced to just two vectors 32 through the process of determining a linearly independent set of support vectors.

Given either (11) or (7) an un-classified sample vector x may be classified by calculating $f(x)$ and then returning $-1$ for all values less than zero and 1 for all values greater than zero.

FIG. 4 is a flow chart of a typical method employed by prior art SVMs for classifying an unknown vector. Steps 34 through 40 are defined in the literature and by equations (7) or (11).

As previously alluded to, because the sets of training vectors may be very large and the time involved to train the SVM may be excessive it would be desirable K it were possible to undertake an a-priori reduction of the training set before the calculation of the support vectors.

It will be realised from the above discussion that a reduced set of vectors might be arrived at by choosing only linearly independent vectors. The determination of the linearly independent support vectors may be undertaken by any method commonly in use in linear algebra. Common methods would be the calculation with pivoting of the reduced row echelon form, the QR factors or the Singular value decomposition. Any of these methods would give a set of r linearly independent vectors that could then be used to calculate the Lagrange multipliers and a decision surface similar to that defined by equation (7). A problem arises however in that it is not clear how to optimally select the support vectors that will be kept in the set.

It is an object of the present invention to provide an improved method for selecting support vectors in a Support Vector Machine.

SUMMARY OF THE INVENTION

According to a first aspect of the present invention there is provided a method for operating a computational device as a support vector machine in order to define a decision surface separating two opposing classes of a training set of vectors, the method including the steps of:

associating a distance parameter with each vector of the training set, the distance parameter indicating a distance from its associated vector to the opposite class; and determining a linearly independent set of support vectors from the training set such that the sum of the distances associated with the linearly independent support vectors is minimised.

The distance parameter may comprise the average of the distances from the vector that the distance parameter is associated with to each of the vectors in the opposite class.

Alternatively the distance parameter may comprise the shortest of the distances from the vector that the distance parameter is associated with to each of the vectors in the opposite class.

In one embodiment the distance parameter is calculated according to the equation $|v-u|^2 = K(u, u) + K(v, v) - 2K(v, u)$ where v and u are vectors and K is a kernel function used to define the decision surface.

The step of determining a linearly independent set of support vectors may be performed by rank revealing QR reduction.

Alternatively the step of determining a linearly independent set of support vectors may be performed applying a reduced row echelon form method with pivoting on the vector having the smallest associated distance parameter.

According to a further aspect of the present invention there is provided a computer software product comprising a computer readable medium for execution by one or more processors of a computer system, the software product including:

instructions to define a decision surface separating two opposing classes of a training set of vectors;

instructions to associate a distance parameter with each vector of the training set, the distance parameter indicating a distance from its associated vector to the opposite class; and instructions to determine a linearly independent set of support vectors from the training set such that the sum of the distances associated with the linearly independent support vectors is minimised.

Preferably the software product includes instructions to calculate the distance parameter as the average of the distances from the vector that the distance parameter is associated with to each of the vectors in the opposite class.

Alternatively the computer software product may include instructions to calculate the distance parameter as the shortest of the distances from the vector that the distance parameter is associated with to each of the vectors in the opposite class.

In one embodiment the distance parameter is calculated according to the equation $|v-u|^2 = K(u, u) + K(v, v) - 2K(v, u)$ where v and u are vectors and K is a kernel function used to define the decision surface.

The computer software product may include instructions to apply rank revealing QR reduction to the support vectors in order to determine the linearly independent set of support vectors.

In one embodiment the computer software product includes instructions to determine the linearly independent set of support vectors by transforming the support vectors to reduced row echelon form with pivoting on the vector having the smallest associated distance parameter.

According to a further aspect of the present invention there is provided a computational device configured to define a decision surface separating two opposing classes of a training set of vectors, the computational device including one or more processors arranged to:

associate a distance parameter with each vector of the training set, the distance parameter indicating a distance from its associated vector to the opposite class; and determine a linearly independent set of support vectors from the training set such that the sum of the distances associated with the linearly independent support vectors is minimised.

The one or more processors may be arranged to determine the distance parameter as the average of the distances from the vector that the distance parameter is associated with to each of the vectors in the opposite class.

Alternatively the one or more processors are arranged to determine the distance parameter as the shortest of the distances from the vector that the distance parameter is associated with to each of the vectors in the opposite class.

In one embodiment the one or more processors are arranged to determine the distance parameter according to the equation $|v-u|^2 = K(u, u) + K(v, v) - 2K(v, u)$ where v and u are vectors and K is a kernel function used to define the decision surface.

The one or more processors may be arranged to apply rank revealing QR reduction to the support vectors in order to determine the linearly independent set of support vectors.

Alternatively, the one or more processors may be arranged to determine the linearly independent set of support vectors by transforming the support vectors to reduced row echelon form with pivoting on the vector having the smallest associated distance parameter.

Further preferred features of the present invention will be described in the following detailed description of an exemplary embodiment wherein reference will be made to a number of figures as follows.

BRIEF DESCRIPTION OF THE DRAWINGS

In order that this invention may be more readily understood and put into practical effect, reference will now be made to the accompanying drawings which illustrate a typical preferred embodiment of the invention and wherein.

DETAILED DESCRIPTION OF EXEMPLARY EMBODIMENTS

Vapnik in his book *Statistical Learning Theory* (Wiley, N.Y., 1998) has shown that the support vector machine selects the hyperplane that minimizes the generalization error, or at least an upper bound on it. The hyperplane with this property is the one that leaves the maximum margin between the two classes, where the margin is defined as the sum of the distances of the hyperplane from the closest points of the two classes. The support vector machine works on finding the maximum margin separating the hyperplane between two subject groups through the minimization of a given quadratic programming problem.

The present inventor has realised that given that it is desirable to find the maximum margin, and that we can calculate the distance between any two points in the test set, the optimal vectors to preselect as potential support vectors are those closest to the decision hyperplane. The vectors closest will be the ones with the minimum distance to the opposing class.

The distance between two vectors in a plane (u, v) can be defined by the magnitude of the difference between them |v−u| or $$|v-u|^2 = |u|^2 + |v|^2 - 2|u||v|\cos\theta \quad (13)$$

where $\theta$ is the angle between them.

But $$\cos\theta = \frac{v^T u}{|u||v|} \text{ so} \quad (14)$$

$$|v-u|^2 = |u|^2 + |v|^2 - 2v^T u \quad (15)$$

In support vector machines the inner product is replaced by a generalized inner product expressed by K(v, u). In the mathematical language of support vector machine equation (15) is written as:

$$|v-u|^2 = K(u, u) + K(v, v) - 2K(v, u). \quad (16)$$

We can define this distance in at least two ways. The average distance from a vector to all vectors in the other class or the shortest distances from the vector to any vector in the other class. Both alternatives work well. Given a set of vectors of size p, the shortest distance from each vector to the opposing class is calculated in feature space. The vectors with the smallest distance are then selected as pivots in either the calculation of the row reduced echelon form of Gaussian Elimination, the Rank-Revealing QR of the SVD. The pivots are known a priori which will make online learning feasible for the support vector machine. Proceeding in this way by pivoting the vector with the smallest distance to the opposing set to the pivot position in the rank revealing algorithm, r linear independent vectors can be selected as the other p-r vectors can be considered linearly dependent on the initial r vectors. A reduced set of linear independent vectors to be trained in an SVM is thus arrived at. Only the linear independent set is used as training vectors for the quadratic programming (QP) problem.

Figure 1:
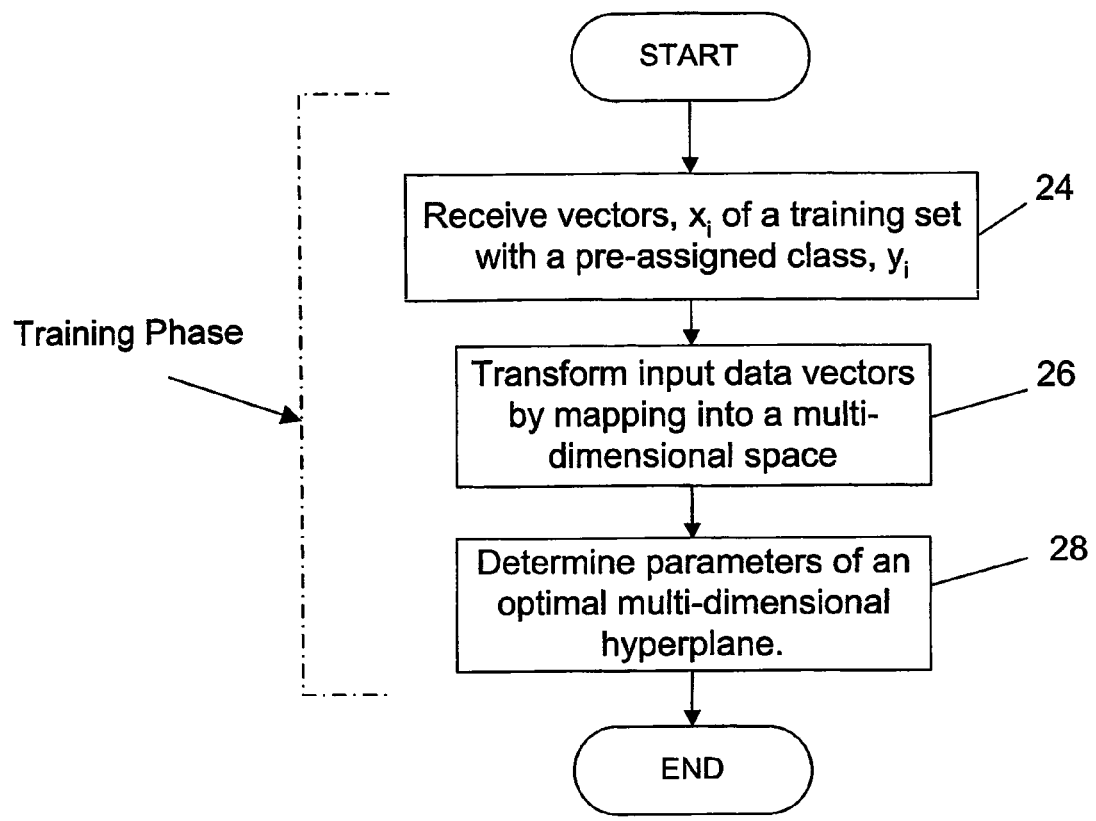
FIG. 1 is a flowchart depicting a training phase during implementation of a prior art support vector machine.
Figure 2:
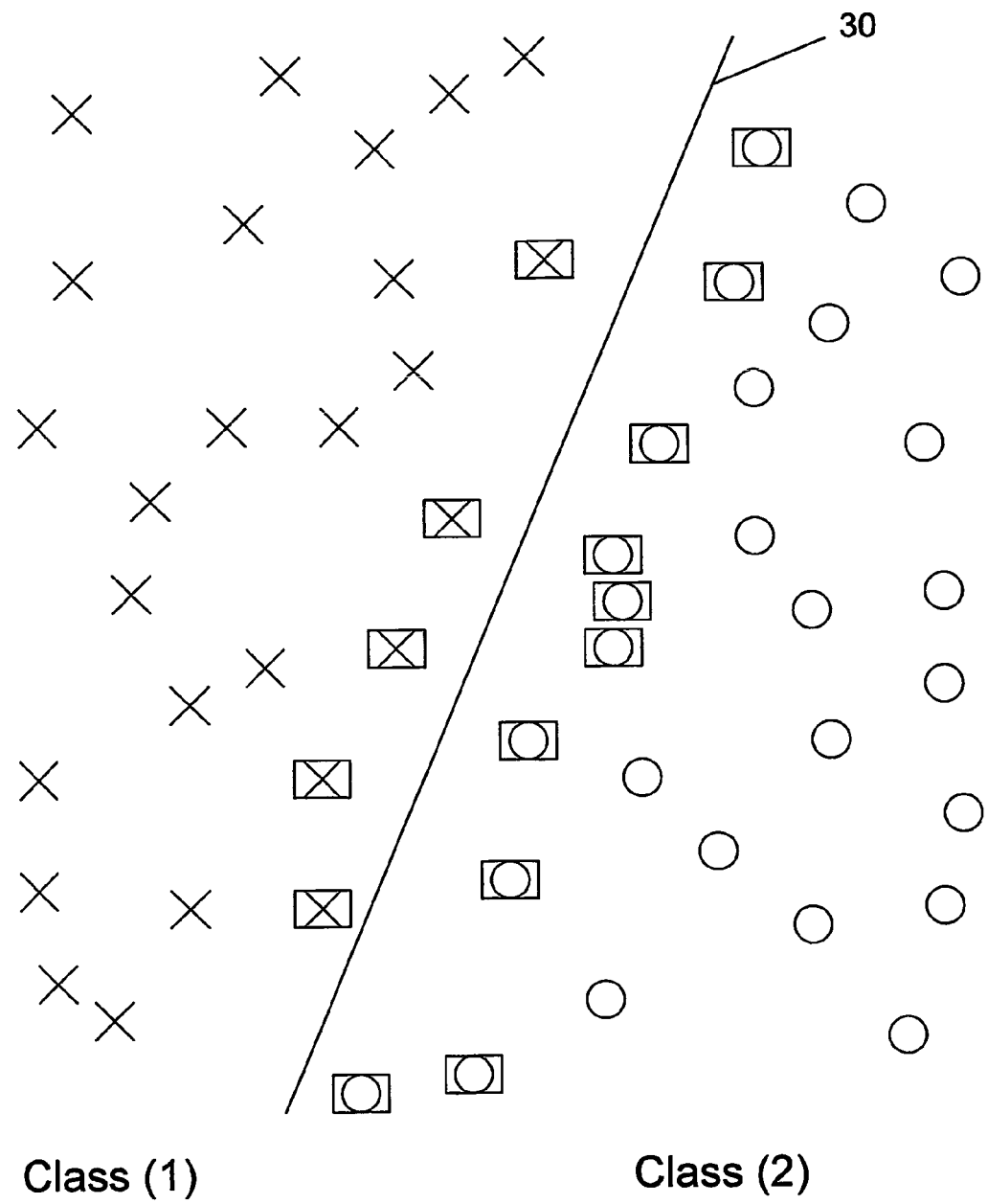
FIG. 2 is a diagram showing a number of support vectors on either side of a decision hyperplane.
Figure 3:
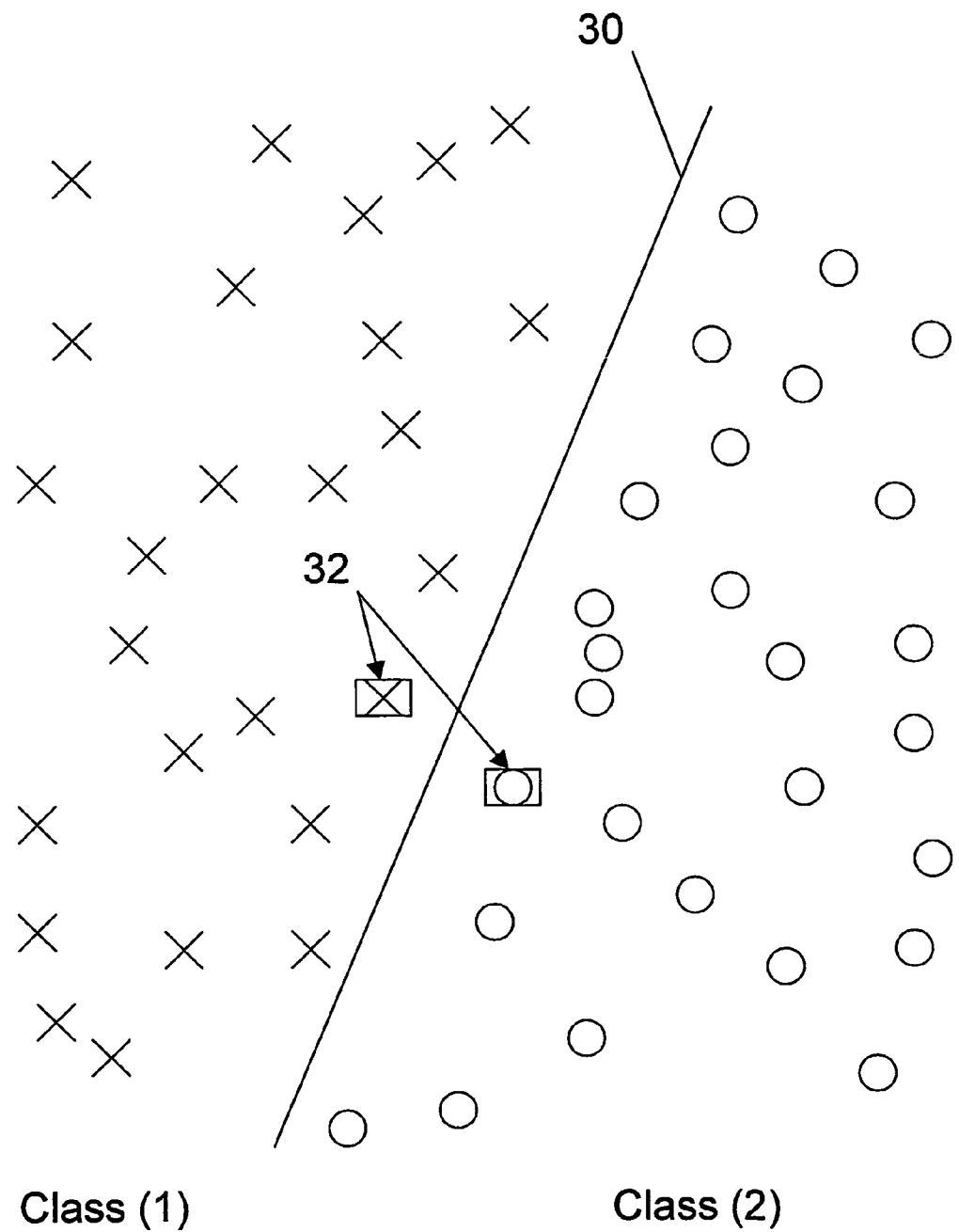
FIG. 3 is a diagram showing a reduced set of support vectors on either side of a decision hyperplane.
Figure 5:
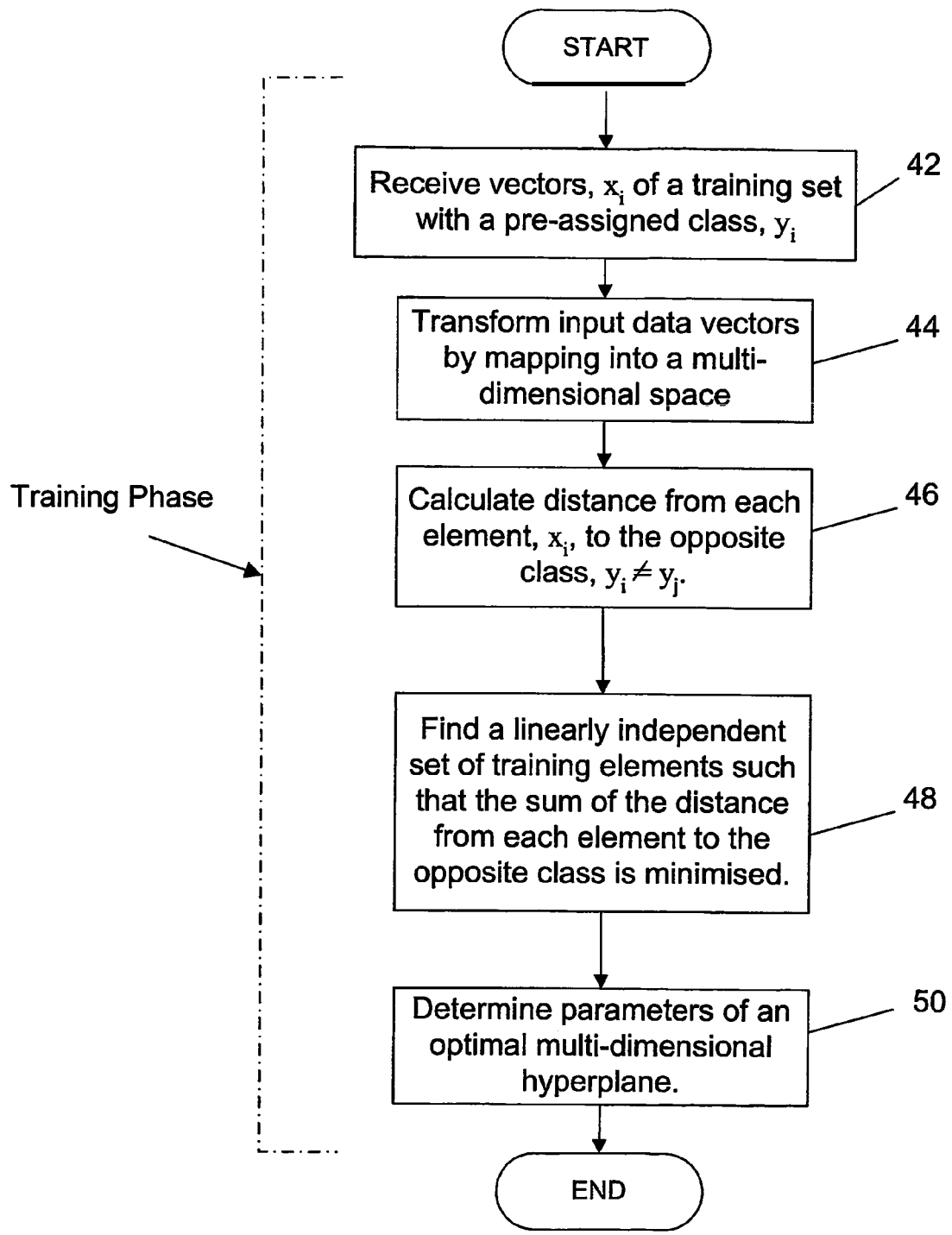
FIG. 5 is a flowchart depicting a training phase method according to a preferred embodiment of the present invention.

FIG. 5 is a flowchart of a method according to a preferred embodiment of the invention. The procedure at step 42 is the same as step 24 in the prior art method of FIG. 1. Step 44 is also exactly the same as step 26 in the prior art method illustrated by FIG. 1. In step 46 however, the distance from each vector $x_i$ to the opposite class, $y_i \neq y_j$ is calculated using:

$$|v-u|^2 = K(u, u) + K(v, v) - 2K(v, u). \quad (17)$$

and then taking a sum of all the distances to other vectors $x_j$ where $y_i \neq y_j$ or by taking the minimum distance to other vectors $x_j$ where $y_i \neq y_j$. In step 46 a linearly independent set of the vectors in feature space is calculated by using any suitable method including the SVD, rank revealing QR or reduced row echelon form (see for example Golub and van Loan; Johns Hopkins University Press; 3rd edition (Nov. 1, 1996) or any other linear algebra text), and pivoting on the smallest distance to the opposite class. Step 50 of FIG. 5 is identical to step 28 of the prior art method of FIG. 1 and includes any solution method for the quadratic programming (QP) problem.

Figure 4:
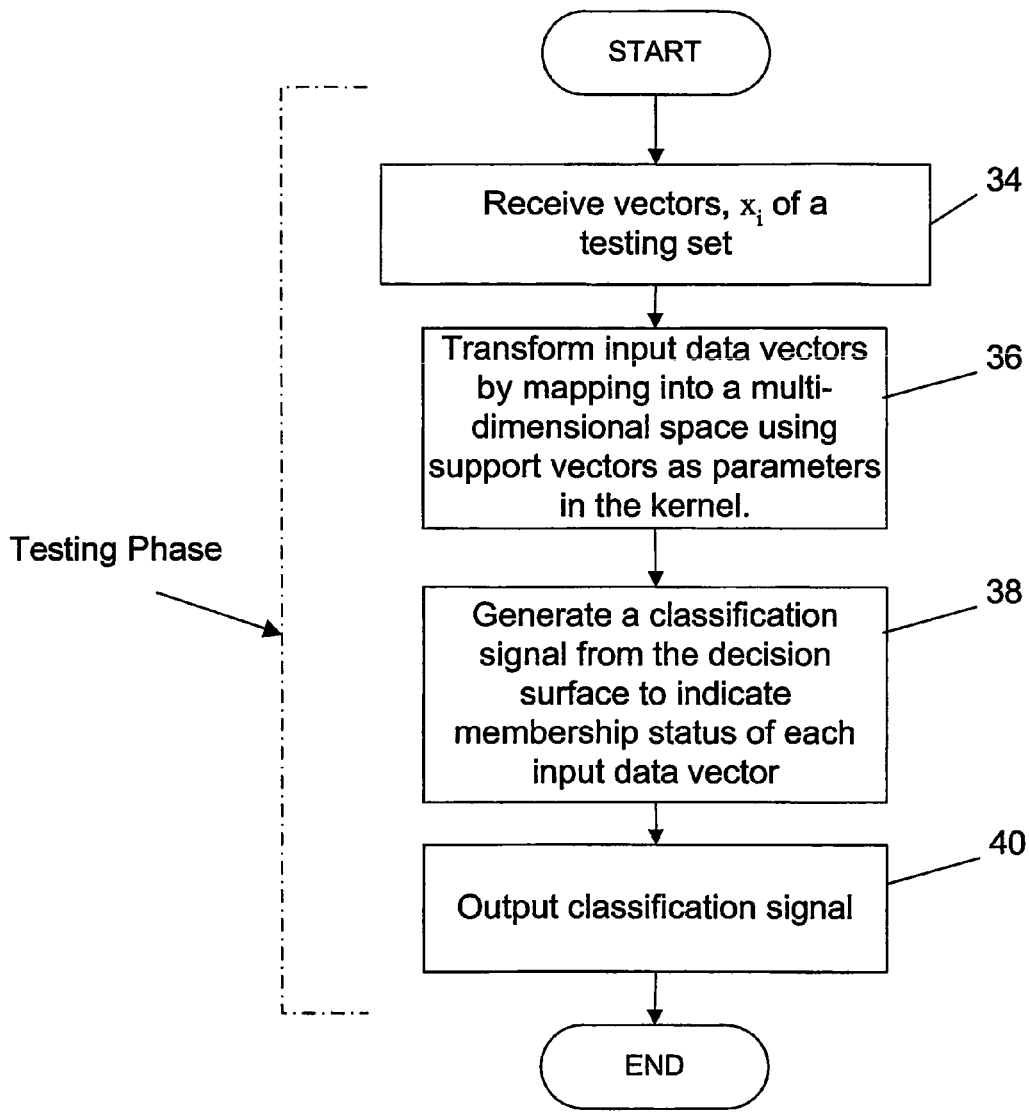
FIG. 4 is a flowchart depicting a testing phase during implementation of a prior art support vector machine.

A subsequent testing phase, wherein unknown vectors x are classified, would proceed according to the method depicted by the flowchart of FIG. 4. Since the training vectors derived in the training phase are linearly independent, there can be no post reduction of the number of support vectors. However; the low number of support vectors in comparison to an unreduced support vector machine will lead to reductions in time in the testing phase in the evaluation of equation (7) or equation (11).

The problem of online learning can be solved by calculating the distance from any new vector to the vectors in the linearly independent set. These vectors are the closest to the boundary and should be the closest to any new vectors. If the newly calculated distance is smaller than a previous distance then the new vector is added to the independent set and the vector with the largest distance can be dropped from the set. The SVM will then need to be retrained with the new independent set.

At this point the SVM is trained as in the literature with the r independent vectors.

From a practical point of view, an SVM according to a preferred embodiment of the present invention is implemented by means of a computational device, such as a personal computer, PDA, or potentially a wireless device such as a mobile phone. The computational device includes one or more processors that execute a software product containing instructions for implementing a method according to the present invention, such as that illustrated in the flowchart of FIG. 5.

Figure 6:
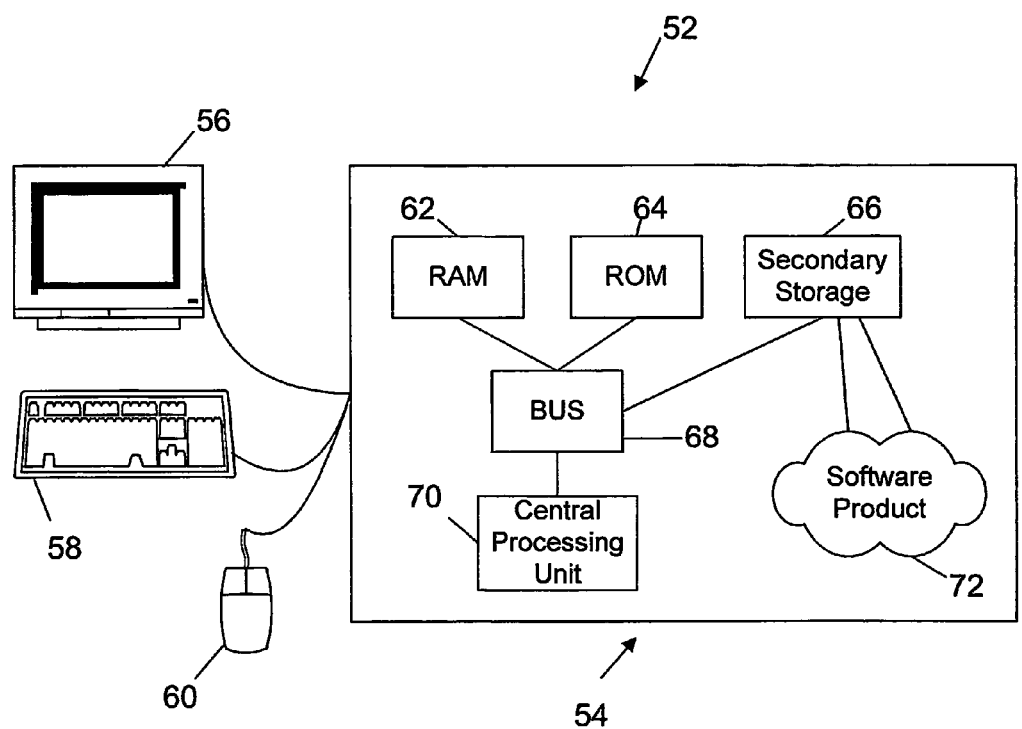
FIG. 6 is a block diagram of a computer system for executing a software product according to the present invention.

FIG. 6 depicts a computational device in the form of a conventional personal computer system 52 which operates as an SVM according to the present invention while executing a support vector machine computer program. Personal Computer system 52 includes data entry devices in the form of pointing device 60 and keyboard 58 and a data output device in the form of display 56. The data entry and output devices are coupled to a processing box 54 which includes at least one processor in the form of central processing unit 70. Central processing unit 70 interfaces with RAM 62, ROM 64 and second and storage device 66. Secondary storage device 66 includes an optical and/or magnetic data storage medium that bears instructions, for execution by central processor 70. The instructions constitute a software product 72 that when executed configures the at least one central processing unit 70 to operate as a support vector machine and in particular to implement the reduced support vector training phase method described above with reference to FIG. 5 and equation 16. It will be realised by those skilled in the art that the programming of software product 72 is straightforward given the method of the present invention.

The embodiments of the invention described herein are provided for purposes of explaining the principles thereof, and are not to be considered as limiting or restricting the invention since many modifications may be made by the exercise of skill in the art without departing from the scope of the following claims.

The invention claimed is:

1. A computer implemented method for operating a computational device as a support vector machine to discriminate a training set of vectors corresponding to a plurality of digital images into opposing first and second classes of vectors wherein the first class of vectors corresponds to a first class of the digital images and the second class corresponds to a second class of the digital images, the method including the steps of:
   associating a distance parameter with each vector of the training set, the distance parameter indicating a distance from its associated vector to the opposite class; and
   determining a linearly independent set of support vectors from the training set such that the sum of the distances associated with the linearly independent support vectors is minimized.

2. A method according to claim 1, wherein the distance parameter comprises the average of the distances from the vector that the distance parameter is associated with to each of the vectors in the opposite class.

3. A method according to claim 1, wherein the distance parameter comprises the shortest of the distances from the vector that the distance parameter is associated with to each of the vectors in the opposite class.

4. A method according to claim 1, wherein the distance parameter is calculated according to the equation $|v-u|^2 = K(u, u) + K(v, v) - 2K(v, u)$ where v and u are vectors and K is a kernel function used to define the decision surface.

5. A method according to claim 1, wherein the step of determining a linearly independent set of support vectors is performed by rank revealing QR reduction.

6. A method according to claim 1, wherein the step of determining a linearly independent set of support vectors is performed by apply a reduced row echelon form method with pivoting on the vector having the smallest associated distance parameter.

7. A computer readable carrier medium for execution by one or more processors of a computer system, the computer readable carrier medium including:
   instructions to discriminate a training set of vectors corresponding to a plurality of digital images into opposing first and second classes of vectors wherein the first class of vectors corresponds to a first class of the digital images and the second class corresponds to a second class of the digital images;
   instructions to associate a distance parameter with each vector of the training set, the distance parameter indicating a distance from its associated vector to the opposite class; and
   instructions to determine a linearly independent set of support vectors from the training set such that the sum of the distances associated with the linearly independent support vectors is minimized.

8. A computer readable carrier medium according to claim 7, including instructions to calculate the distance parameter as the average of the distances from the vector that the distance parameter is associated with to each of the vectors in the opposite class.

9. A computer readable carrier medium according to claim 7, including instructions to calculate the distance parameter as the shortest of the distances from the vector that the distance parameter is associated with to each of the vectors in the opposite class.

10. A computer readable carrier medium according to claim 7, including instructions to calculate the distance parameter according to the equation $|v-u|^2 = K(u, u) + K(v, v) - 2K(v, u)$ where v and u are vectors and K is a kernel function used to define the decision surface.

11. A computer readable carrier medium according to claim 7, including instructions to apply rank revealing QR reduction to the support vectors in order to determine the linearly independent set of support vectors.

12. A computer readable carrier medium according to claim 7, including instructions to determine the linearly independent set of support vectors by transforming a matrix of the support vectors to reduced row echelon form by pivoting on the vector having the smallest associated distance parameter.

13. A computational device configured to discriminate a training set of vectors corresponding to a plurality of digital images into opposing first and second classes of vectors wherein the first class of vectors corresponds to a first class of the digital images and the second class corresponds to a second class of the digital images, the computational device including one or more processors arranged to:
   associate a distance parameter with each vector of the training set, the distance parameter indicating a distance from its associated vector to the opposite class; and
   determine a linearly independent set of support vectors from the training set such that the sum of the distances associated with the linearly independent support vectors is minimized.

14. A computational device according to claim 13, wherein the one or more processors are arranged to determine the distance parameter as the average of the distances from the vector that the distance parameter is associated with to each of the vectors in the opposite class.

15. A computational device according to claim 13, wherein the one or more processors are arranged to determine the distance parameter as the shortest of the distances from the vector that the distance parameter is associated with to each of the vectors in the opposite class.

16. A computational device according to claim 13, wherein the one or more processors are arranged to determine the distance parameter according to the equation $|v-u|^2 = K(u, u) + K(v, v) - 2K(v, u)$ where v and u are vectors and K is a kernel function used to define the decision surface.

17. A computational device according to claim 13, wherein the one or more processors are arranged to apply rank revealing QR reduction to the support vectors in order to determine the linearly independent set of support vectors.

18. A computational device according to claim 13, wherein the one or more processors are arranged to determine the linearly independent set of support vectors by transforming a matrix of the support vectors to reduced row echelon form with pivoting on the vector having the smallest associated distance parameter.

* * * * *